(12) United States Patent
Wolk et al.

(10) Patent No.: US 11,326,504 B2
(45) Date of Patent: May 10, 2022

(54) COOLING CONTROL SYSTEM

(71) Applicant: Caterpillar Inc., Peoria, IL (US)

(72) Inventors: Matthew T. Wolk, Peoria, IL (US); Samuel Were, Peoria, IL (US); James Mutti, Germantown Hills, IL (US); Brian P. Brennan, Steger, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/725,303

(22) Filed: Dec. 23, 2019

(65) Prior Publication Data

US 2021/0189944 A1 Jun. 24, 2021

(51) Int. Cl.
| | |
|---|---|
| *F01P 7/04* | (2006.01) |
| *F01P 5/04* | (2006.01) |
| *F02M 26/45* | (2016.01) |
| *F02B 37/22* | (2006.01) |
| *F01P 7/02* | (2006.01) |
| *F01P 1/06* | (2006.01) |

(52) U.S. Cl.
CPC .................. *F01P 7/04* (2013.01); *F01P 1/06* (2013.01); *F01P 5/04* (2013.01); *F01P 7/026* (2013.01); *F02B 37/22* (2013.01); *F02M 26/45* (2016.02); *F01P 2025/13* (2013.01); *F01P 2025/50* (2013.01)

(58) Field of Classification Search
CPC .. F01P 7/04; F01P 5/04; F01P 2025/13; F01P 2025/50; F01P 1/06; F01P 7/026; F02M 26/45; F02B 37/22
See application file for complete search history.

(56) References Cited

U.S. PATENT DOCUMENTS

| | | | |
|---|---|---|---|
| 6,318,312 B1 | 11/2001 | Siemens | |
| 6,922,925 B2* | 8/2005 | Watanabe | E02F 3/325 37/466 |
| 2007/0209610 A1* | 9/2007 | Bradley | F01P 7/167 123/41.29 |
| 2013/0199178 A1* | 8/2013 | Kanou | F02M 26/28 60/605.2 |
| 2016/0237884 A1* | 8/2016 | Yamada | F02B 37/186 |

FOREIGN PATENT DOCUMENTS

DE 102013203063 A1 9/2013

* cited by examiner

*Primary Examiner* — Syed O Hasan
(74) *Attorney, Agent, or Firm* — Harrity & Harrity LLP (57) ABSTRACT

A system including a cooling fan, an actuator with an actuator temperature sensor, and a controller is disclosed. The controller may be configured to receive temperature data from the actuator temperature sensor. The temperature data may include information relating to an actuator temperature of the actuator. The controller may be configured to compare the actuator temperature with a temperature threshold associated with the actuator, and control the cooling fan to adjust the actuator temperature based on determining that the actuator temperature satisfies the temperature threshold.

20 Claims, 4 Drawing Sheets

| Actuator | Temperature Threshold | Cooling Device |
|---|---|---|
| <Actuator 1> | <Threshold 1> | <Cooling Device(s) 1/2> |
| <Actuator 2> | <Threshold 2> | <Cooling Device 1> |
| <Actuator 3> | <Threshold 3> | <Cooling Device 2> |
| <Actuator 4> | <Threshold 4> | <Cooling Device 1> |
| ... | | |

FIG. 3A

| Actuator | Actuator Temperature | Temperature Threshold | Action |
|---|---|---|---|
| <Actuator 1> | <Temperature 1> | <Threshold 1> | Enable Cooling Device(s) for Threshold Duration(s) |
| <Actuator 2> | <Temperature 2> | <Threshold 2> | Enable Cooling until Threshold Cleared |
| <Actuator 3> | <Temperature 3> | <Threshold 3> | Enable Cooling until Threshold Cleared |
| <Actuator 4> | <Temperature 4> | <Threshold 4> | Disable Cooling until Threshold Cleared |
| ... | | | ... |

COOLING CONTROL SYSTEM

TECHNICAL FIELD

The present disclosure relates generally to cooling systems and, for example, to a cooling control system for an actuator of a work machine.

BACKGROUND

A work machine (e.g., an articulated truck, a haul truck, a dozer, a loader, an excavator, a motor grader, a paving machine, and/or another work machine) is often driven by an engine (e.g., a gasoline engine, a gaseous fuel-powered engine, a gas turbine engine, and/or another combustion engine). Because an engine generates heat, and because heat can negatively affect engine performance, such engine-driven work machines are typically provided with a cooling system that is configured to maintain an operating temperature of the engine below a threshold temperature. The cooling system may use an air-to-air heat exchanger to remove heat from intake air directed into the engine and/or a liquid-to-air heat exchanger to remove heat from coolant that is circulated throughout the engine. Heat from the intake air and/or the coolant is transferred to air by one or more cooling fans (e.g., a primary cooling fan, a secondary cooling fan, an auxiliary cooling fan, and/or the like). The cooling system may determine an amount of cooling that is needed based on an operating temperature of the engine, and adjust the amount of cooling by controlling an operating speed of one or more of the cooling fans.

The cooling system may be fitted within an engine compartment of the work machine and arranged to provide optimized cooling for the engine. However, the engine bay may include other components (e.g., an electronic actuator, an electrohydraulic actuator, a pneumatic actuator, and/or the like) that are adversely affected by extreme temperatures but not sufficiently aided by the cooling system. In some cases, an actuator (e.g., a variable geometry turbocharger (VGT) actuator, an exhaust gas recirculation (EGR) actuator, and/or the like) may be positioned near a turbocharger, near an exhaust gas conduit, and/or in another location within the engine compartment that is subject to higher temperatures and/or unable to adequately benefit from an amount of cooling provided by existing cooling systems. In such cases, excess heat and/or prolonged exposure to such heat may cause malfunction and/or complete failure of the actuator. Furthermore, as actuators typically lack a means to inform an operator of the work machine of such malfunctions and/or failures, the operator may continue operating the engine and cause additional adverse effects.

One solution for cooling an electromagnetic actuator device of an internal combustion engine is disclosed in U.S. Pat. No. 6,318,312, by Bauer, et al., filed on Jun. 12, 2000 ("the"). The '312 patent discloses an actuator that includes a solenoid body and a valve body, which define therebetween a generally annular volume into which cooling fluid is fed by a supply line and from which cooling fluid is withdrawn by a discharge line. The '312 patent discloses that a component temperature of the actuator 20 may be determined, approximately or virtually, in an electronic control unit associated with the actuator. The electronic control unit can compare the determined component temperature with a critical component temperature, or a critical electrical parameter corresponding to this temperature, whereupon the electrical control unit controls a driver to adjust a valve, and thereby regulate an amount of cooling fluid required by the actuator. However, the '312 patent does not disclose a cooling control system that monitors an actuator temperature and controls one or more cooling fans of a work machine to sustain the actuator temperature within optimal operating temperatures. The '312 patent also does not disclose a cooling control system that enables selective cooling of a VGT actuator, an EGR actuator, and/or the like.

A cooling control system of the present disclosure solves one or more of the problems set forth above and/or other problems in the art.

SUMMARY

According to some implementations, a system may include a cooling fan, an actuator having an actuator temperature sensor, and a controller configured to receive temperature data from the actuator temperature sensor, the temperature data including information relating to an actuator temperature of the actuator, compare the actuator temperature with a temperature threshold associated with the actuator, and control the cooling fan to adjust the actuator temperature based on determining that the actuator temperature satisfies the temperature threshold.

According to some implementations, a device may include one or more memories and one or more processors, communicatively coupled to the one or more memories, configured to receive temperature data from an actuator temperature sensor of an actuator, the temperature data including information relating to an actuator temperature of the actuator, compare the actuator temperature with a temperature threshold associated with the actuator, and control a cooling fan to adjust the actuator temperature for a threshold duration based on determining that the actuator temperature satisfies the temperature threshold.

According to some implementations, a method may include receiving temperature data from an actuator temperature sensor of an actuator, the temperature data including information relating to an actuator temperature of the actuator; comparing the actuator temperature with a temperature threshold associated with the actuator; and controlling a cooling fan to adjust the actuator temperature based on determining that the actuator temperature satisfies the temperature threshold.

DETAILED DESCRIPTION

Figure 1:
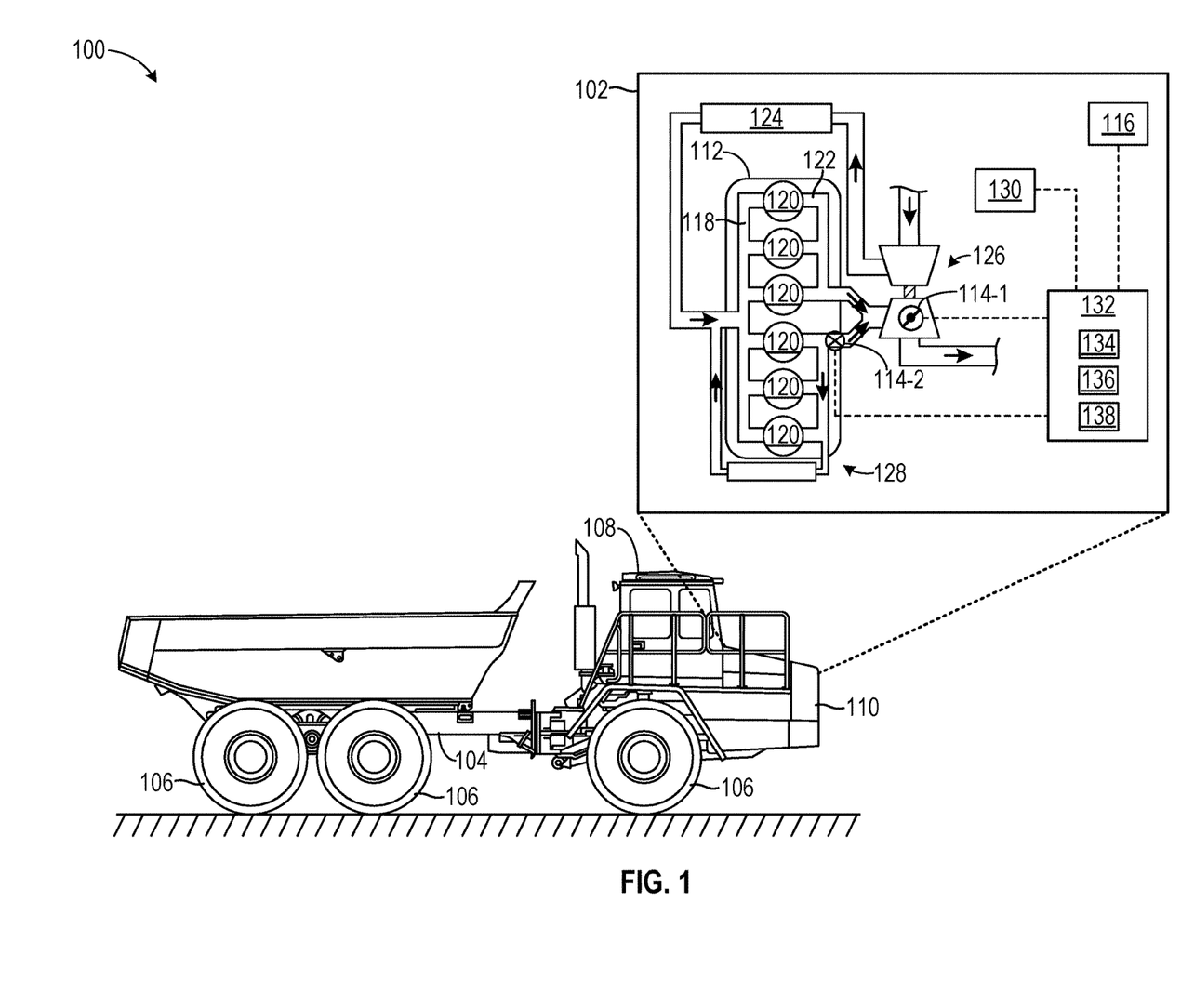
FIG. 1 is a diagram of an example work machine with a cooling control system described herein.

FIG. 1 is a diagram of an example work machine 100 with a cooling control system 102 described herein. As shown in FIG. 1, work machine 100 may correspond to an articulated truck, a haul truck, a dozer, a loader, an excavator, a motor grader, a paving machine, and/or another work machine. Work machine 100 includes a frame 104, traction elements 106, an operator cab 108, and an engine compartment 110. Traction elements 106 may include wheels or tracks that are coupled to frame 104 and used to propel work machine 100. Operator cab 108 may be coupled to frame 104 and configured to support an operator of work machine 100 and include one or more components that enable an operator to control an operation of work machine 100. Engine compartment 110 may be supported by frame 104 and configured to enclose an engine 112, an actuator 114, a machine sensor 116, cooling control system 102, and/or another component associated with engine 112 and/or work machine 100. Engine 112 may include a diesel engine, a gasoline engine, a natural gas engine, a hybrid engine, an electric motor, and/or another power source configured to drive traction elements 106.

Engine 112 includes an intake manifold 118, combustion chambers 120, and an exhaust manifold 122. Intake manifold 118 may direct air into combustion chambers 120 for combustion. In some examples, intake manifold 118 may include an intercooler 124 to reduce a temperature of the air being directed to combustion chambers 120. Combustion chambers 120 may be configured to combust an intake charge (e.g., a mixture of air and fuel) to generate power (e.g., rotational torque) for work machine 100. Exhaust manifold 122 may direct exhaust gas resulting from the combustion from combustion chamber 120 to an aftertreatment system and/or otherwise expel the exhaust gas from engine 112. Engine 112 may be provided with a variable geometry turbocharger (VGT) 126 and/or another type of turbocharger configured to use a flow of the exhaust gas to compress air that is supplied to intake manifold 118. Engine 112 may be provided with an exhaust gas recirculation (EGR) system 128 configured to recirculate a portion of the exhaust gas into intake manifold 118 to reduce a combustion temperature of engine 112.

Actuator 114 includes one or more devices configured to selectively move and/or otherwise control a mechanism associated with engine 112 and/or work machine 100. Actuator 114 may be electronically operated, electro-hydraulically operated, pneumatically operated, and/or the like. For example, actuator 114 may correspond to an actuator 114-1 associated with VGT 126, an actuator 114-2 associated with EGR system 128, and/or the like. Actuator 114-1 of VGT 126 may be configured to adjust positions of vanes of VGT 126 and adjust a volume of air that is directed into intake manifold 118 based on an operating condition of engine 112. Actuator 114-2 of EGR system 128 may be configured to adjust an amount of exhaust gas that is recirculated into intake manifold 118 based on an operating condition of engine 112. Actuator 114 may include an actuator temperature sensor (e.g., a thermocouple, a thermistor, a resistance temperature detector, a semiconductor-based sensor, and/or the like) that is configured to measure a temperature of actuator 114, and communicate temperature data relating to the temperature of actuator 114 to cooling control system 102 and/or another device.

Machine sensor 116 includes one or more devices configured to measure an operating condition of engine 112 and/or work machine 100. For example, machine sensor 116 may include an ambient temperature sensor, an oil temperature sensor, a coolant temperature sensor, an in-cylinder temperature sensor, an exhaust port temperature sensor, and/or another sensing device associated with engine 112 and/or work machine 100 that can be used by cooling control system 102 to monitor and regulate a temperature within engine compartment 110. Machine sensor 116 may include a sensing device configured to provide another operating condition of engine 112 (e.g., an operating time, a travel speed, a wheel speed, an engine speed, a throttle position, a torque demand, an engine load, an oil pressure, a mass air flow rate, and/or the like). Machine sensor 116 may be configured to measure an operating condition of engine 112 and/or work machine 100, and communicate machine sensor data relating to the operating condition to cooling control system 102 and/or another device.

Cooling control system 102 includes a cooling device 130 and a controller 132. Cooling device 130 may include an air-based cooling mechanism and/or a liquid-based cooling mechanism. For example, cooling device 130 may include one or more cooling fans (e.g., a primary cooling fan, and auxiliary cooling fan, and/or the like) and/or another device configured to regulate a temperature within engine compartment 110. Cooling device 130 may include one or more vents that are arranged to direct cool air and/or warm air within engine compartment 110 in a manner that regulates temperature. Cooling device 130 may include a coolant circuit with one or more valves configured to assist in regulating the temperature within engine compartment 110. Controller 132 may be in electrical communication with actuator 114, machine sensor 116, and/or cooling device 130, and configured to selectively control cooling device 130 to regulate a temperature within engine compartment 110. Controller 132 may be integrated with or include an engine control module (ECM), an engine control unit (ECU), and/or another controller that is associated with work machine 100 and/or engine 112. Controller 132 may be dedicated to cooling control system 102 and provided separately from an ECM, an ECU, and/or another controller associated with work machine 100 and/or engine 112.

Controller 132 includes a processor 134, a memory 136, and a communication device 138. Processor 134 is implemented in hardware, firmware, and/or a combination of hardware and software capable of being programmed to perform a function associated with work machine 100, engine 112, and/or cooling control system 102. Memory 136 includes a random-access memory (RAM), a read only memory (ROM), and/or another type of dynamic or static storage device that stores information and/or instructions to be performed by processor 134. Communication device 138 includes a local area network (LAN) component (e.g., an Ethernet component and/or a Wi-Fi component), a radio frequency (RF) communication component (e.g., a Bluetooth component and/or a cellular component), a positioning component (e.g., a global positioning system (GPS) component and/or a global navigation satellite system (GNSS) component), and/or the like. Communication device 138 may enable communication between cooling control system 102 and another system of work machine 100, and/or between work machine 100 and another device associated with an operation of work machine 100 (e.g., another work machine, a management platform, a control station, a network storage device, and/or the like).

As indicated above, FIG. 1 is provided as an example. Other examples may differ from what is described in connection with FIG. 1.

Figure 2:
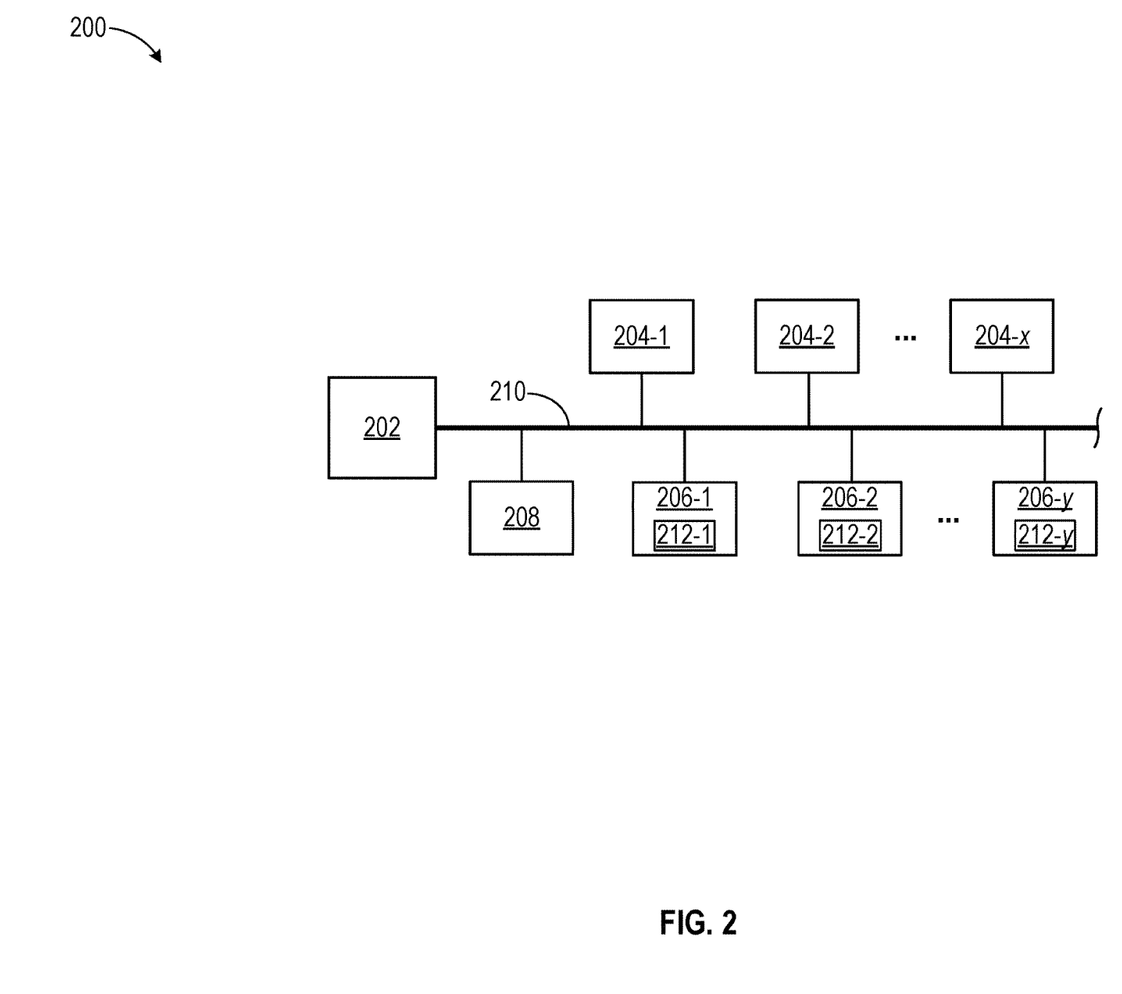
FIG. 2 is a diagram of an example cooling control system described herein.

FIG. 2 is a diagram of an example cooling control system 200 (e.g., cooling control system 102 in FIG. 1) described herein. As shown in FIG. 2, cooling control system 200 includes a controller 202 (e.g., controller 132 in FIG. 1), a cooling device 204 (e.g., cooling device 130 in FIG. 1), an actuator 206 (e.g., actuator 114 in FIG. 1), a machine sensor 208 (e.g., machine sensor 116 in FIG. 1), and a communication bus 210 (e.g., a controller area network (CAN) bus and/or the like). Cooling device 204 may include a primary cooling fan 204-1, an auxiliary cooling fan 204-2, and/or the like, and actuator 206 may include a VGT actuator 206-1, an EGR actuator 206-2, and/or the like. Actuator 206 may include an actuator temperature sensor 212 configured to measure a respective actuator temperature (e.g., an internal temperature and/or another temperature associated with actuator 206). For example, a first actuator temperature sensor 212-1 may be configured to measure a temperature of VGT actuator 206-1 and a second actuator temperature sensor 212-2 may be configured to measure a temperature of EGR actuator 206-2. Controller 202 may exchange information with cooling device 204, actuator 206, actuator temperature sensor 212, and/or machine sensor 208 via communication bus 210.

In some implementations, cooling control system 200 may be configured to regulate temperatures of actuators 206. For example, controller 202 may be configured to receive temperature data from actuator temperature sensors 212, compare actuator temperatures with respective temperature thresholds of actuators 206, and selectively control cooling devices 204 to restore the actuator temperatures to optimal operating temperatures when one or more of the temperature thresholds are satisfied. A temperature threshold may correspond to a range of optimal operating temperatures associated with actuators 206 that defines a maximum operating temperature and a minimum operating temperature associated with actuators 206. If an actuator temperature satisfies the maximum operating temperature, controller 202 may be configured to control cooling device 204 in a manner that reduces the actuator temperature to an optimal operating temperature. If an actuator temperature satisfies the minimum operating temperature, controller 202 may be configured to control cooling device 204 in a manner that enables the actuator temperature to increase to an optimal operating temperature.

In some implementations, controller 202 may be configured to adjust temperature thresholds based on information that may affect optimal operating temperatures of actuators 206. For example, controller 202 may be configured to receive machine sensor data (e.g., from machine sensor 208 and/or the like), and adjust the temperature threshold based on the machine sensor data. Machine sensor data may include information relating to an ambient temperature, an operating condition, and/or other information associated with engine 112 and/or work machine 100. Individual actuators 206 may have different temperature thresholds (e.g., different maximum and/or minimum operating temperatures). For example, VGT actuator 206-1 and EGR actuator 206-2 may have different maximum and/or minimum operating temperatures (e.g., due to a difference in structural design, functional design, and/or the like). In such cases, controller 202 may be configured to refer to an index of respective temperature thresholds of actuators 206 (e.g., stored in memory 136 and/or another data structure that is accessible to controller 202), and monitor individual actuator temperatures relative to the respective temperature thresholds.

In some implementations, controller 202 may regulate the actuator temperatures by selectively enabling or disabling cooling devices 204. For example, controller 202 may enable primary cooling fan 204-1 and/or auxiliary cooling fan 204-2 to reduce the actuator temperatures, or disable primary cooling fan 204-1 and/or auxiliary cooling fan 204-2 to enable the actuator temperatures to increase. Controller 202 may enable cooling devices 204 for a threshold duration, and disable cooling devices 204 upon expiration of the threshold duration. Controller 202 may receive updated temperature data (e.g., intermittently, periodically, or continuously in real-time) from actuator temperature sensors 212, and disable cooling devices 204 based on the updated temperature data. Controller 202 may regulate actuator temperatures by adjusting a fan speed and/or a position of primary cooling fan 204-1 and/or auxiliary cooling fan 204-2, and/or by controlling one or more adjustable vents to direct cool air or warm air toward or away from actuators 206. Controller 202 may control an adjustable coolant valve and/or another mechanism that may capable of regulating the actuator temperatures.

In some implementations, cooling control system 200 may use a single cooling device 204 to regulate the actuator temperatures of multiple actuators 206 (e.g., a subset of actuators 206 that may be disposed within a common area of engine compartment 110), and/or use multiple cooling devices 204 to regulate the actuator temperature of a single actuator 206. Cooling control system 200 may use different combinations of cooling devices 204 to regulate the actuator temperatures of different types of actuators 206 (e.g., to account for differences in respective locations of actuators 206, respective temperature thresholds of actuators 206, respective designs of actuators 206, and/or the like). For example, enabling auxiliary cooling fan 204-2 for a threshold duration may provide sufficient cooling for an overheating EGR actuator 206-2, but insufficient cooling for an overheating VGT actuator 206-1. In such cases, controller 202 may use auxiliary cooling fan 204-2 to cool EGR actuator 206-2, and use primary cooling fan 204-1 and auxiliary cooling fan 204-2 contemporaneously to cool VGT actuator 206-1. Controller 202 may use other arrangements of cooling devices 204 and/or other control schemes to regulate actuator temperatures depending on an arrangement of cooling devices 204 and actuators 206 within engine compartment 110.

Cooling control system 200 may be configured to provide individual actuators 206 with dedicated cooling devices 204. For example, cooling devices 204 may be disposed within, coupled to, and/or positioned in proximity to corresponding actuators 206 to provide more direct control of the actuator temperatures of actuators 206. Cooling devices 204 may use dedicated cooling fans, adjustable vents, adjustable valves, and/or other mechanisms configured to regulate individual actuator temperatures of actuators 206. In such cases, if an actuator temperature of an affected actuator 206 satisfies a respective temperature threshold, controller 202 may be configured to refer to an index of actuators 206 and associated cooling devices 204 (e.g., stored in memory 136 and/or another data structure that is accessible to controller 202) to identify an appropriate cooling device 204 to use for the affected actuator 206, and control cooling device 204 to restore the affected actuator 206 to an optimal operating temperature. Cooling control system 200 may include a fewer or a greater number of cooling devices 204 and/or actuators 206 than shown in FIG. 2.

As indicated above, FIG. 2 is provided as an example. Other examples may differ from what is described in connection with FIG. 2.

Figure 3A:
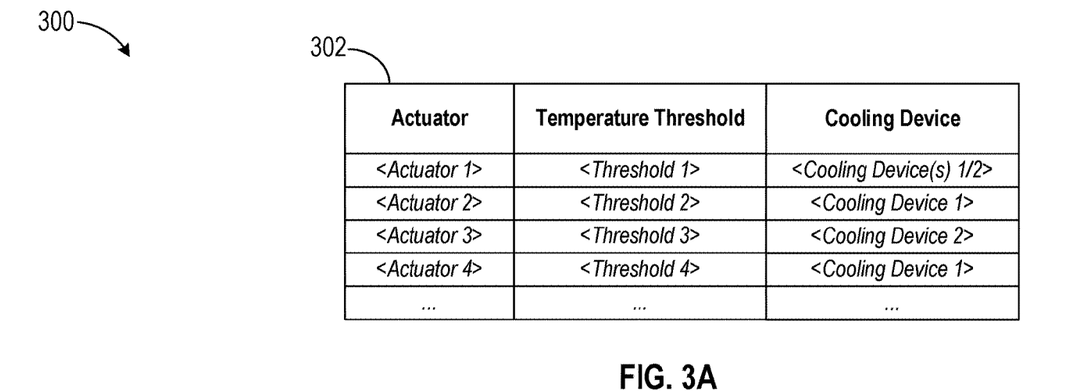
FIGS. 3A-3B are diagrams of an example implementation of a cooling control system described herein.
Figure 3B:
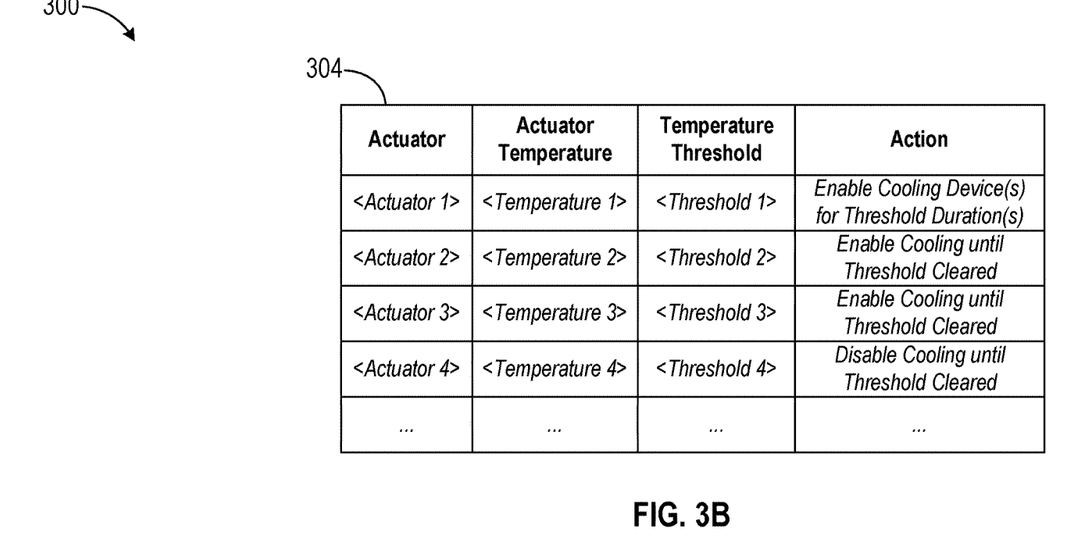

FIGS. 3A-3B are diagrams of an example implementation 300 of cooling control system 200 described herein. As shown in FIG. 3A, and by reference number 302, cooling control system 200 may include be associated with a data structure that includes information identifying a plurality of cooling devices 204 (e.g., Cooling Devices 1-2) and a plurality of actuators 206 (e.g., Actuators 1-4). For example, cooling devices 204 may include primary cooling fan 204-1, auxiliary cooling fan 204-2, and/or the like, and actuators 206 may include VGT actuator 206-1, EGR actuator 206-2, and/or the like. As shown for the example in FIG. 3A, respective actuator temperatures of actuators 206 may be regulated using different combinations of cooling devices 204. For example, controller 202 may be configured to regulate an actuator temperature of a first actuator 206 (e.g., Actuator 1) using a combination of cooling devices 204 (e.g., Cooling Devices 1 and 2), and regulate an actuator temperature of a second actuator 206 (e.g., Actuator 2) using a single cooling device 204 (e.g., Cooling Device 1). Controller 202 may be configured to refer to an index (e.g., a table, a map, and/or the like) to identify appropriate cooling devices 204 to use for different actuators 206.

In some implementations, controller 202 may be configured to identify respective temperature thresholds (e.g., maximum operating temperatures, minimum operating temperatures, and/or the like) of actuators 206. As shown for the example in FIG. 3A, different actuators 206 may have different temperature thresholds (e.g., Thresholds 1-4). In such cases, controller 202 may be configured to refer to an index to identify the different temperature thresholds of the different actuators 206. In some examples, different actuators 206 may be configured to operate within similar operating temperatures. In such cases, controller 202 may be configured to use a single temperature threshold for multiple actuators 206. Additionally, or alternatively, controller 202 may be configured to adjust one or more of the temperature thresholds based on an ambient temperature, an operating condition, and/or other information associated with engine 112 and/or work machine 100 that may affect operating characteristics of actuators 206. In such cases, controller 202 may modify and/or record values of an index corresponding to adjusted temperature thresholds.

As further shown in FIG. 3B, and by reference number 304, controller 202 may be associated with a data structure that includes information identifying an actuator 206, an actuator temperature, a temperature threshold, and an action that is to be performed. Controller 202 may be configured to receive temperature data from actuator temperature sensors 212 of actuators 206. The temperature data may include information relating to respective actuator temperatures (e.g., Temperatures 1-4) of actuators 206. Controller 202 may be configured to compare the actuator temperatures with the respective temperature thresholds of actuators 206, stored in the data structure, to determine whether one or more of the actuator temperatures satisfies the corresponding temperature thresholds. If an actuator temperature satisfies a corresponding temperature threshold, controller 202 may cause a corresponding action to restore the actuator temperature to within a range of optimal operating temperatures. Controller 202 may be configured to refer to an index that identifies the appropriate actions to be performed for different actuators 206 and different temperature conditions. For example, the index may indicate types of cooling devices 204 to use, threshold durations for controlling cooling devices 204, control schemes for controlling cooling devices 204, and/or other information that enables controller 202 to regulate actuator temperatures.

In some implementations, such as when an actuator temperature satisfies a maximum operating temperature threshold (e.g., Thresholds 1-3), controller 202 may enable one or more cooling devices 204 to provide increased cooling for a threshold duration and/or until updated temperature data indicates that the actuator temperature no longer satisfies the maximum operating temperature threshold. In some examples, such as when an actuator temperature satisfies a minimum operating temperature threshold (e.g., Threshold 4), controller 202 may disable one or more cooling devices 204 to provide decreased cooling for a threshold duration and/or until updated temperature data indicates that the actuator temperature no longer satisfies the minimum operating temperature threshold. Controller 202 may transmit an engine control signal to engine 112 that temporarily adjusts an operating temperature of engine 112 (e.g., via an adjustment of an engine load, a mass flow rate of VGT 126, and/or the like) in order to adjust an operating temperature of engine 112 and a temperature within engine compartment 110, and thereby aid in regulating actuator temperatures.

In some implementations, controller 202 may be configured to safeguard actuators 206, engine 112, and/or work machine 100 from adverse effects that may result from suboptimal actuator temperatures. For example, if an actuator 206 exhibits suboptimal actuator temperatures for a prolonged duration, controller 202 may be configured to temporarily disable the actuator 206 for a threshold duration and/or until updated temperature data indicates that optimal operating temperatures are restored. Controller 202 may be configured to respond to prolonged suboptimal temperature conditions by temporarily disabling an operation of engine 112 and/or work machine 100 for a threshold duration and/or until updated temperature data indicates that optimal temperatures are restored. Additionally, or alternatively, controller 202 may be configured to generate a notification (e.g., to an operator of work machine 100) identifying suboptimal actuator temperatures, affected actuators 206, actions performed in response to the suboptimal temperature condition, and/or the like.

As indicated above, FIGS. 3A-3B are provided as an example. Other examples may differ from what is described in connection with FIGS. 3A-3B.

Figure 4:
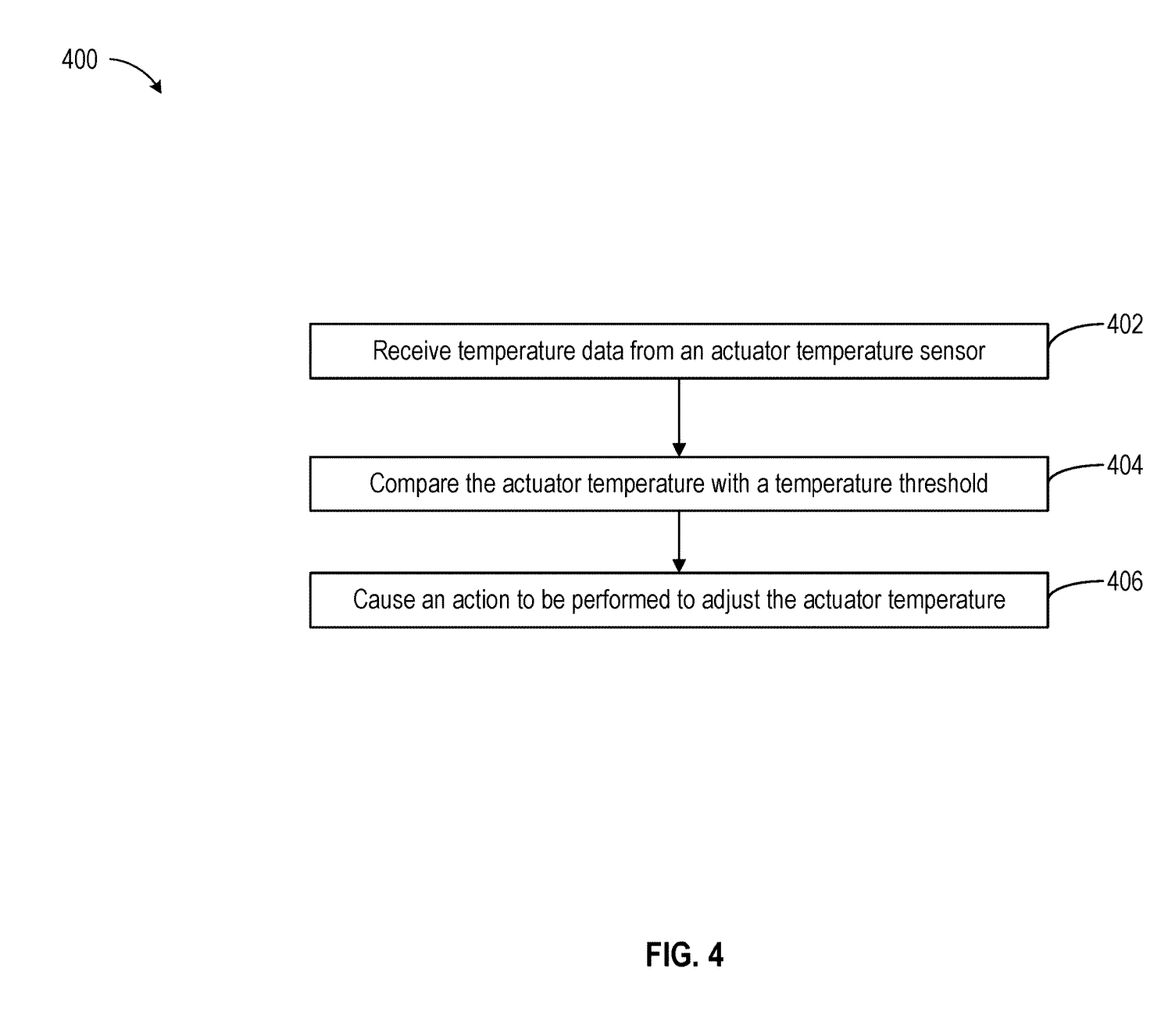
FIG. 4 is a flow chart of an example process for controlling a cooling device of a work machine.

FIG. 4 is a flow chart of an example process 400 for controlling a cooling device of a work machine. One or more process blocks of FIG. 4 may be performed by a controller (e.g., controller 132 of cooling control system 102 and/or controller 202 of cooling control system 200) and/or by another component or a group of components separate from or including the controller (e.g., an ECM, an ECU, and/or another controller associated with work machine 100, engine 112, and/or cooling control system 102, 200).

As shown in FIG. 4, process 400 may include receiving temperature data from an actuator temperature sensor of an actuator, the temperature data including information relating to an actuator temperature of the actuator (block 402). For example, the controller (e.g., using processor 134, memory 136, communication device 138, and/or the like) may receive temperature data from an actuator temperature sensor of an actuator, as described above. In some examples, the temperature data may include information relating to an actuator temperature of the actuator.

As further shown in FIG. 4, process 400 may include comparing the actuator temperature with a temperature threshold associated with the actuator (block 404). For example, the controller (e.g., using processor 134, memory 136, communication device 138, and/or the like) may compare the actuator temperature with a temperature threshold associated with the actuator, as described above.

As further shown in FIG. 4, process 400 may include controlling a cooling fan to adjust the actuator temperature based on determining that the actuator temperature satisfies the temperature threshold (block 406). For example, the controller (e.g., using processor 134, memory 136, communication device 138, and/or the like) may control a cooling fan to adjust the actuator temperature based on determining that the actuator temperature satisfies the temperature threshold, as described above.

Process 400 may include variations and/or additional implementations to those described in connection with FIG. 4, such as any single implementation or any combination of implementations described elsewhere herein. Although FIG. 4 shows example blocks of process 400, in some examples, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

An engine-driven work machine (e.g., an articulated truck, a haul truck, a dozer, a loader, an excavator, a motor grader, a paving machine, and/or another work machine) may be fitted with a cooling system designed to maintain an operating temperature of an engine (e.g., a gasoline engine, a gaseous fuel-powered engine, a gas turbine engine, and/or another combustion engine) below a threshold temperature. The cooling system may use a combination of an air-based cooling mechanism and/or a liquid-based cooling mechanism to expel heat from the engine and/or an engine compartment of the work machine. Although cooling systems may provide optimized cooling for the engine, there may be other components (e.g., an electronic actuator, an electro-hydraulic actuator, a pneumatic actuator, and/or the like) that are positioned in areas of the engine compartment that are more susceptible to heat and/or unable to receive adequate cooling. An actuator that is exposed to excess and/or prolonged heat may malfunction and/or fail. Furthermore, as actuators typically lack a means to inform an operator of the work machine of such malfunctions and/or failures, an operator may continue operating the engine and cause additional adverse effects.

A cooling control system 102, 200 described herein addresses the setbacks described above. For instance, cooling control system 102, 200 includes a cooling device 130, 204, an actuator 114, 206, and a controller 132, 202. Actuator 114, 206 includes an actuator temperature sensor 212 that is configured to measure an actuator temperature (e.g., an internal temperature and/or another temperature associated with actuator 114, 206), and communicate the actuator temperature to controller 132, 202 via a communication bus 210 (e.g., a CAN bus) of a work machine 100. Controller 132, 202 is configured to monitor the actuator temperature provided by actuator temperature sensor 212, and selectively control cooling device 130, 204 in a manner that maintains the actuator temperature within optimal operating temperatures of actuator 114, 206. Controller 132, 202 is configured to regulate the actuator temperature relative to a temperature threshold that corresponds to a maximum operating temperature and/or a minimum operating temperature threshold of actuator 114, 206. If work machine 100 includes multiple cooling devices 130, 204 and/or multiple actuators 114, 206, controller 132, 202 can selectively control different combinations of cooling devices 130, 204 to regulate the actuator temperatures of different actuators 114, 206.

Accordingly, cooling control system 102, 200 overcomes one or more problems associated with currently available cooling systems. For instance, by using temperature data provided directly from actuator temperature sensors 212, cooling control system 102, 200 is able to accurately monitor individual actuator temperatures, identify when the actuator temperatures approach or reach suboptimal actuator temperatures, and promptly respond to regulate the actuator temperatures. Cooling control system 102, 200 responds to suboptimal actuator temperatures by controlling available cooling devices 130, 204, temporarily disabling an operation of an engine 112 and/or work machine 100, generating a notification relating to the suboptimal actuator temperatures, and/or the like. Cooling control system 102, 200 thereby leverages existing cooling devices 130, 204 to maintain actuators 114, 206 in optimal operating conditions. Cooling control system 102, 200 also selectively enables and disables cooling devices 130, 204 as needed to conserve power. Furthermore, by maintaining actuators 114, 206 in optimal operating conditions, cooling control system 102, 200 also maintains engine 112 and/or work machine 100 in optimal operating conditions, reduces downtime, and increases productivity.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

What is claimed is:

1. A system, comprising: a plurality of cooling fans; a plurality of actuators including: a variable geometry turbocharger (VGT) actuator, and a different actuator that is different from the VGT actuator, the plurality of cooling fans including: a first cooling fan for cooling the VGT actuator, and a second cooling fan for cooling the different actuator; and a controller configured to: receive temperature data from an actuator temperature sensor of the VGT actuator, the temperature data including information relating to an actuator temperature of the VGT actuator, determine that the actuator temperature satisfies a temperature threshold associated with the VGT actuator, identify the first cooling fan to use for cooling the VGT actuator, and control the first cooling fan to adjust the actuator temperature based on determining that the actuator temperature satisfies the temperature threshold.

2. The system of claim 1, wherein the controller is in electrical communication with the first cooling fan and the actuator temperature sensor via one or more communication buses of a work machine associated with the first cooling fan and the VGT actuator.

3. The system of claim 1, wherein the different actuator is an exhaust gas recirculation (EGR) actuator.

4. The system of claim 1, wherein the temperature threshold corresponds to a range of optimal operating temperatures associated with the VGT actuator,
   the range of optimal operating temperatures being defined between a maximum operating temperature threshold and a minimum operating temperature threshold associated with the VGT actuator, and
   the controller being configured to control the first cooling fan to adjust the actuator temperature based on determining that the actuator temperature satisfies one of the maximum operating temperature threshold or the minimum operating temperature threshold.

5. The system of claim 1, wherein the first cooling fan further includes one or more of an auxiliary cooling fan, a vent, or a valve configured to adjust the actuator temperature.

6. The system of claim 1, wherein the controller, when controlling the first cooling fan, is configured to:
   enable the first cooling fan to reduce the actuator temperature based on determining that the actuator temperature exceeds a maximum operating temperature associated with the VGT actuator, or disable the first cooling fan based on determining that the actuator temperature is below a minimum operating temperature associated with the VGT actuator.

7. The system of claim 1, wherein the controller is further configured to:
receive different temperature data from a different actuator temperature sensor of the different actuator,
determine, based on the different temperature data, that a different actuator temperature, of the different actuator, satisfies a different temperature threshold associated with the different actuator, and
control the second cooling fan based on determining that the different actuator temperature satisfies the different temperature threshold.

8. A device, comprising: one or more memories; and one or more processors, communicatively coupled to the one or more memories, configured to: receive temperature data from an actuator temperature sensor of a variable geometry turbocharger (VGT) actuator of a plurality of actuators of a system, the temperature data including information relating to an actuator temperature, determine that the actuator temperature satisfies a temperature threshold associated with the VGT actuator, identify a first cooling fan, of a plurality of cooling fans of the system, to use for cooling the VGT actuator, the plurality of cooling fans further including a second cooling fan for cooling a different actuator of the plurality of actuators, and control the first cooling fan to adjust the actuator temperature for a threshold duration based on determining that the actuator temperature satisfies the temperature threshold.

9. The device of claim 8, wherein the temperature threshold corresponds to a range of optimal operating temperatures associated with the VGT actuator,
the range of optimal operating temperatures having a maximum operating temperature associated with the VGT actuator, and
the first cooling fan being controlled to adjust the actuator temperature based on determining that the actuator temperature exceeds the maximum operating temperature.

10. The device of claim 8, wherein the one or more processors, when controlling the first cooling fan, are configured to:
control one or more of an auxiliary cooling fan, a vent, or a valve to adjust the actuator temperature.

11. The device of claim 8, wherein the one or more processors are further configured to:
receive updated temperature data from the actuator temperature sensor of the VGT actuator;
determine, based on the updated temperature data, that the actuator temperature does not satisfy the temperature threshold; and
disable the first cooling fan based on determining that the actuator temperature does not satisfy the temperature threshold.

12. The device of claim 8, wherein the one or more processors are further configured to:
receive machine sensor data from a set of machine sensors of a work machine associated with the VGT actuator,
the machine sensor data including information relating to one or more of an ambient temperature or an operating condition of the work machine; and
adjust the temperature threshold based on the machine sensor data.

13. A method, comprising: receiving temperature data from an actuator temperature sensor of a first actuator of a plurality of actuators of a system, the temperature data including information relating to an actuator temperature of the first actuator; determining that the actuator temperature satisfies a temperature threshold associated with the first actuator; identifying a first cooling fan, of a plurality of cooling fans of the system, to use for cooling the first actuator, the plurality of cooling fans further including a second cooling fan for cooling a second actuator of the plurality of actuators, and the second actuator including an exhaust gas recirculation (EGR) actuator that is different from the first actuator; and controlling the first cooling fan to adjust the actuator temperature based on determining that the actuator temperature satisfies the temperature threshold.

14. The method of claim 13, wherein the temperature threshold corresponds to a range of optimal operating temperatures associated with the first actuator,
the range of optimal operating temperatures being defined between a maximum operating temperature threshold and a minimum operating temperature threshold associated with the first actuator, and
the first cooling fan being controlled to adjust the actuator temperature based on determining that the actuator temperature satisfies one of the maximum operating temperature threshold or the minimum operating temperature threshold.

15. The method of claim 13, wherein controlling the first cooling fan comprises:
enabling the first cooling fan for a threshold duration.

16. The method of claim 13, wherein controlling the first cooling fan further comprises:
controlling one or more of an auxiliary cooling fan, a vent, or a valve to adjust the actuator temperature.

17. The method of claim 13, further comprising:
receiving updated temperature data from the actuator temperature sensor of the first actuator;
determining, based on the updated temperature data, that the actuator temperature does not satisfy the temperature threshold; and
disabling the first cooling fan based on determining that the actuator temperature does not satisfy the temperature threshold.

18. The method of claim 13, further comprising:
receiving machine sensor data from a set of machine sensors of a work machine associated with the first actuator,
the machine sensor data including information relating to one or more of an ambient temperature or an operating condition of the work machine; and
adjusting the temperature threshold based on the machine sensor data.

19. The method of claim 13, wherein the plurality of actuators further include:
a third actuator associated with the first cooling fan and the second cooling fan.

20. The method of claim 13, wherein the first actuator is a variable geometry turbocharger (VGT) actuator.

* * * * *